(12) United States Patent
Streckert et al.

(10) Patent No.: US 6,447,945 B1
(45) Date of Patent: Sep. 10, 2002

(54) PORTABLE ELECTRONIC DEVICE POWERED BY PROTON EXCHANGE MEMBRANE FUEL CELL

(75) Inventors: Holger H. Streckert, Rancho Santa Fe; Linden P. Blue, La Jolla, both of CA (US)

(73) Assignee: General Atomics, San Diego, CA (US)

( * ) Notice: Subject to any disclaimer, the term of this patent is extended or adjusted under 35 U.S.C. 154(b) by 56 days.

(21) Appl. No.: 09/735,698

(22) Filed: Dec. 12, 2000

(51) Int. Cl.[7] .............................................. H01M 2/00
(52) U.S. Cl. ............................ 429/34; 429/40; 429/42; 429/26; 204/267; 204/270; 428/570; 428/402; 428/627; 428/634; 700/286; 700/195
(58) Field of Search .............................. 700/286, 195; 428/570, 402, 627, 634; 429/34, 42, 40, 26; 204/267, 270

(56) References Cited

U.S. PATENT DOCUMENTS

| | | | |
|---|---|---|---|
| 5,292,600 A | 3/1994 | Kaufman | 429/39 |
| 5,306,577 A | 4/1994 | Sprouse | 429/17 |
| 5,314,762 A | 5/1994 | Hamada et al. | 429/37 |
| 5,316,643 A | 5/1994 | Ahn et al. | 204/265 |
| 5,378,339 A | 1/1995 | Aoki et al. | 204/260 |
| 5,512,145 A | 4/1996 | Hollenberg | 205/628 |
| 5,776,625 A | 7/1998 | Kaufman et al. | 429/30 |
| 5,932,365 A | 8/1999 | Lin et al. | 429/12 |
| 5,952,118 A | 9/1999 | Ledjeff et al. | 429/32 |
| 5,976,725 A | 11/1999 | Gamo et al. | 429/25 |
| 6,057,051 A | 5/2000 | Uchida et al. | 429/19 |
| 6,259,971 B1 * | 7/2001 | Mitchell | 700/286 |
| 6,326,097 B1 * | 12/2001 | Hockaday | 429/26 |

* cited by examiner

Primary Examiner—Bruce F. Bell
(74) Attorney, Agent, or Firm—Fitch, Even, Tabin, & Flannery

(57) ABSTRACT

A portable electronic device incorporates PEM fuel cells and is designed to operate by the reaction of hydrogen from a hydride-containing fuel container and oxygen from the air, while efficiently removing the product water by a novel water transportation system. Temperature is effectively controlled by placing a plurality of fuel cell subunits as a generally planar array in the lid of the PC adjacent a heat transfer plate. A particularly efficient resupply system is provided where an electrolyzer that supplies $H_2$ at a pressure sufficient to continue to power the PC and simultaneously recharge an operatively-connected container and a second spare container in the electrolyzer.

20 Claims, 5 Drawing Sheets

PORTABLE ELECTRONIC DEVICE POWERED BY PROTON EXCHANGE MEMBRANE FUEL CELL

FIELD OF THE INVENTION

This invention relates to portable electronic devices powered by proton exchange membrane (PEM) fuel cells which produce water as a by-product of electricity generation. More specifically, the invention relates to portable electronic devices, such as laptop computers and the like, particularly those which employ a two-piece case, that are powered by PEM fuel cells and to associated units for recharging such fuel cells.

BACKGROUND OF THE INVENTION

PEMs are a type of fuel cell wherein a chemical reaction occurs between hydrogen and oxygen converting chemical energy directly into electrical energy and efficiently generating power while the only by-product is water. Hydrogen for such fuel cells can be supplied from a variety of known sources. PEM fuel cells are well known, and such cells which use hydrogen and air to create electricity are shown, for example, in U.S. Pat. No. 5,776,625. Such fuel cells are commercially available from DeNora S.p.A. Atmospheric air is a readily available source for oxygen, and hydrogen is conveniently supplied from tanks loaded with granular metal alloys which store hydrogen as in the form of a hydride. Such hydrogen storage units are disclosed, for example, in U.S. Pat. Nos. 4,489,205, 5,512,145, 5,314,762, 5,976,725 and 6,057,051.

Certain of these patents disclose the incorporation of fuel cells of this general type in laptop personal computers (PCs). However, as of yet, these devices have been generally conceptual, and it has been felt that improvements in such systems are necessary before they will obtain widespread commercial acceptance. Accordingly, the industry has continued to pursue such improvements.

SUMMARY OF THE INVENTION

The invention provides portable electronic devices powered by PEM fuel cells which include arrangements for effectively and efficiently removing water generated at such fuel cells from the interior of a case, such as a case which holds the commonly used laptop personal computer.

The invention further provides a combination of such a PEM fuel cell-powered portable electronic device with an electrolyzer unit for efficiently recharging a hydrogen reservoir while at the same time powering the electronic device.

The invention also provides a portable personal computer which is powered by a PEM fuel cell that is incorporated within a two-piece case having the CPU in the base of the case and the display screen in the lid of the case, where air entering the base of the case is blown past the CPU, channeled to the lid and then leaves the case through exit openings in the lid after supplying oxygen to the PEM fuel cells that are located in the lid behind the display screen and removing heat therefrom.

DETAILED DESCRIPTION OF THE PREFERRED EMBODIMENTS

Figure 7:
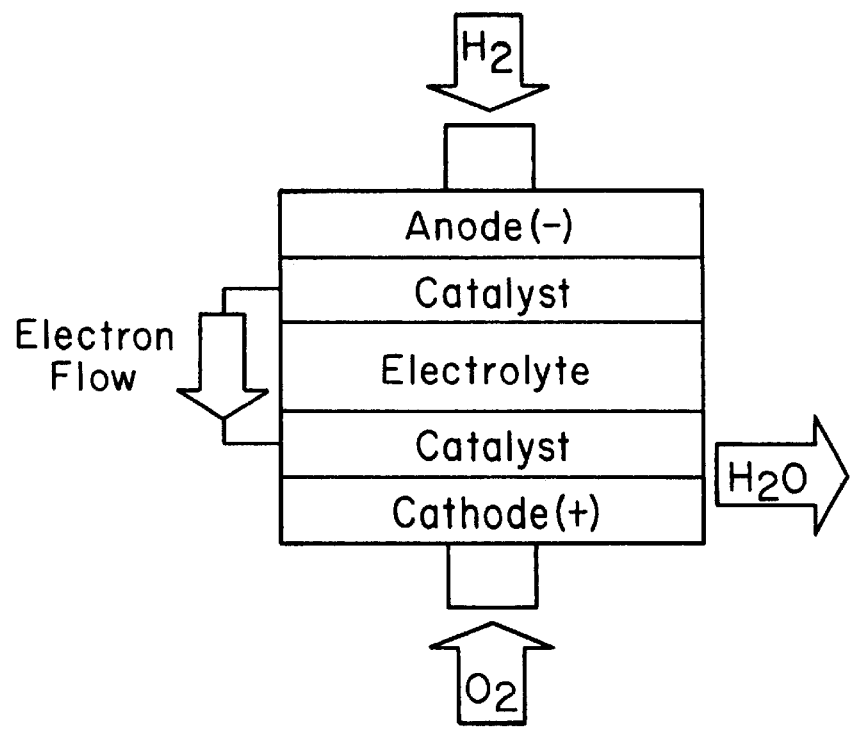
FIG. 7 is a schematic view showing the operation of a PEM fuel cell.

This inventive concept revolves around the employment of PEM fuel cells. As shown schematically in FIG. 7, these proton exchange membrane fuel cells employ a polymer membrane as the electrolyte; although the membrane is an electronic insulator, it serves as an excellent conductor of hydrogen ions. Although various membranes can be used, a preferred membrane is that which is marketed by DuPont and sold under the trademark Nafion which is a perfluorosulfonate monomer. Nafion is one example of such polytetrafluoroethylene(Teflon)-based ionomers useful in fuel cells; it is a perfluoronated polymer containing small proportions of sulfonic and/or carboxylic ionic functional groups.

Electrodes are provided by coating opposite surfaces of a planar, for example, membrane. Anodes and cathodes are prepared by applying small amounts of platinum black to one surface of a thin sheet of porous graphitized paper that has been previously wet-proofed with Teflon. The Nafion electrolyte is then sandwiched between two such sheets which serve as the anode and the cathode, and the three components are sealed together under heat and pressure to produce a single membrane/electrode assembly, sometimes referred to as an MEA. The MEA will usually be less than a millimeter in thickness. Platinum black serves as a catalyst at both the anode and the cathode in one such arrangement developed by the U.S. DOD. Other suitable catalysts may alternatively be used. The anode and cathode are in contact, on the rear side of each, with flow field plates, for example, graphite or metal plates in which parallel channels have been formed. Examples of such plates are shown in U.S. Pat. No. 5,952,118. The ridges between the channels make electrical contact with the respective electrode surfaces and supply current to an external circuit, while the channels supply hydrogen to the anode and oxygen to the cathode.

Hydrogen is consumed at the anode yielding electrons to the anode and producing hydrogen ions which enter the electrolyte. The $H_2$ channels are dead ended. At the cathode, oxygen from the stream of air that is being supplied combines with electrons from the cathode and with hydrogen ion from the electrolyte to produce water vapor. The water vapor is rejected from the rear surface of the cathode where it creates a high humidity air stream which is directed to an exit conduit, composed of the nitrogen content of the air and the portion of the oxygen that does not react. A PEM fuel cell operating with a Nafion membrane will likely operate at a temperature of about 50 to 80° C. so that most of the water being formed will be in vapor form. Under certain circumstances, e.g. when operating at peak power and in a location where the ambient conditions may have an elevated humidity, some water vapor may condense to fine droplets in the oxygen flow channels. Preferably, the arrangement will be such that, when the computer is in its operating mode, the stream of air flowing through the cathode side of the MEA will exit horizontally, and the flowing stream of air will force any condensed water out of the oxygen channels of the MEA. Located adjacent the discharge from the air flow channels is a wick or water transportation arrangement, which is described in detail hereinafter, that effectively and efficiently carries any condensed water away from the immediate vicinity of the fuel cell, dispersing it along a large surface area which aids in evaporation and subsequent discharge from the portable electronic unit in the form of water vapor, so that no liquid water will drip from or be apparent on the exterior of the electronic device.

Figure 1:
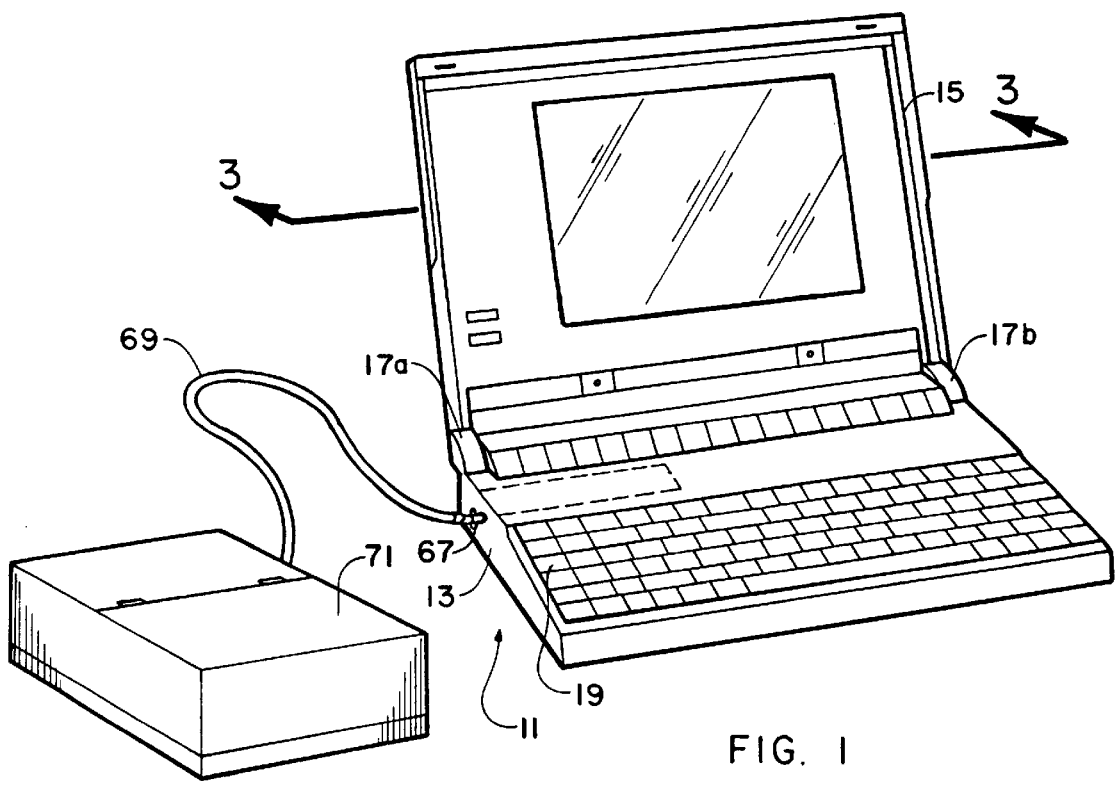
FIG. 1 is a schematic view showing a portable electronic device in the form of a personal laptop computer which incorporates a two-piece hinged case in combination with an electrolyzer unit which generates hydrogen gas for recharging purposes.

Illustrated in FIG. 1 is a personal computer 11 of the laptop type which includes a two-piece case wherein a lower or a base section 13 is hinged to an upper or lid section 15 by a pair of hinges 17a and 17b, which are preferably located at opposite ends of the rear wall of the base section although they could alternatively be provided in other locations if desired. The base section 13 of the computer includes a standard keyboard 19 in its upper surface, which covers the main compartment wherein operative elements of the PC reside.

Figure 2:
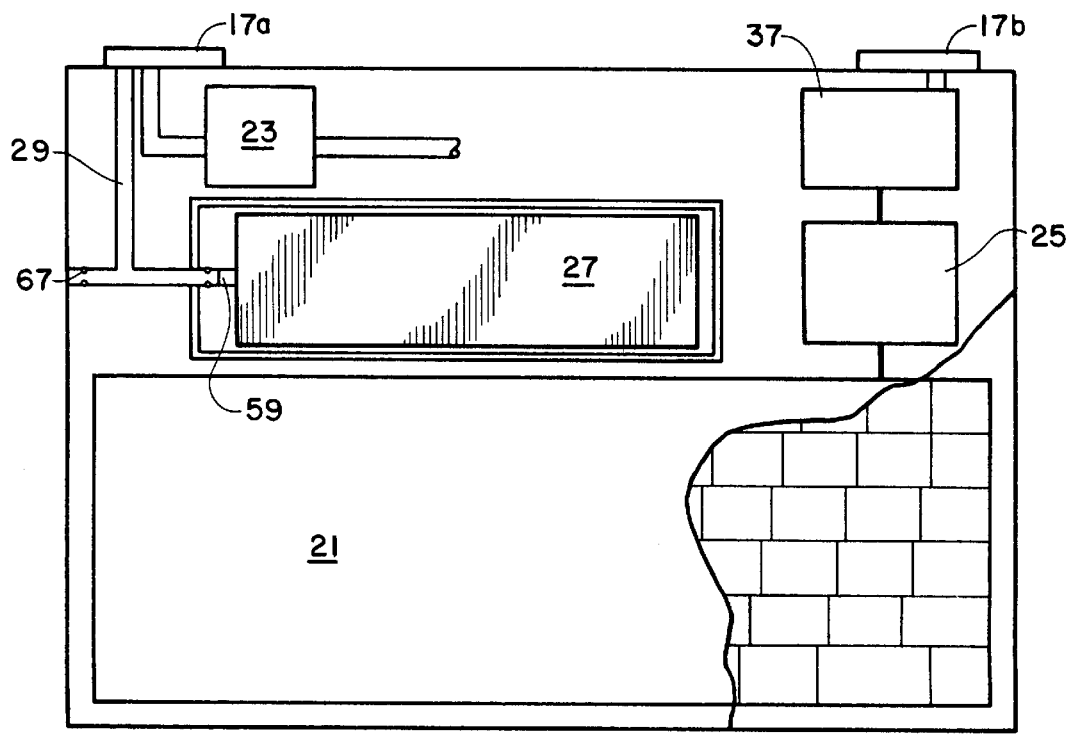
FIG. 2 is a schematic view of certain of the operating components located in the base compartment of the personal computer of FIG. 1.
Figure 3:
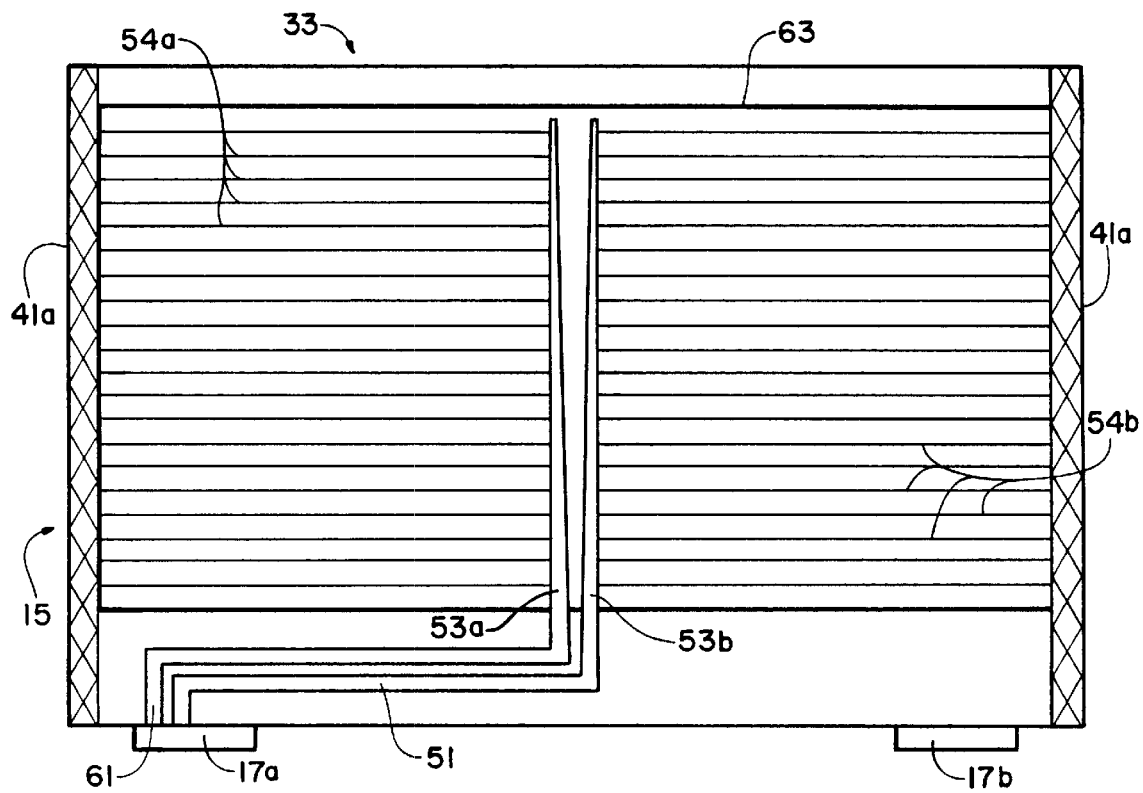
FIG. 3 is a schematic view of certain of the fuel cell and water transportation system located in the lid compartment of the personal computer of FIG. 1, which shows how air and $H_2$ are supplied to the PEM fuel cells.

As schematically depicted in FIG. 2, the compartment includes a CPU 21, a blower 23 for circulating air past the CPU, electrical circuitry 25 (represented schematically), a hydrogen supply container or cartridge 27 and a hydrogen gas conduit system 29. A liquid crystal display screen 31 is located in the undersurface of the lid section 15, and as illustrated in FIG. 3, the PEM fuel cell power-generating unit 33 is preferably located in the compartment provided in the lid section 15 between the display screen 31 and the cover or wall surface 35 of the lid. The fuel cell unit 33 may alternatively be located in the base section compartment; however, its preferable location in an internal compartment within the lid section 15 gives rise to particular advantages that are explained in detail hereinafter.

When the fuel cell unit 33 is located in the lid section, a DC/DC converter 37 may also be located there; however, the DC/DC converter 37 is preferably located in the base section adjacent to the CPU. Electrical connections between the components in the lid section and those in the base section are effected through sliding contacts in the hinge 17a as generally well known in this art. Specifically, the electrical power from the fuel cell unit 33 flows through such an electrical connection in the hinge 17a to the DC/DC converter and then to the CPU and to the peripheral circuitry 25 which supplies power to the blower motor 23. Thereafter, the output signals from the CPU flow back through a second electrical connection in the hinge 17a to the display screen in the lid section. The peripheral circuitry 25 of course also interconnects the keyboard 19 and the CPU 21. This electrical circuitry also includes the usual connector and adaptor (not shown) for running the PC from standard, e.g. 120V AC, power.

The hydrogen container 27 is a replaceable item and is conveniently located in a compartment or pocket 39 provided in the base compartment 13. This arrangement may be a generally similar arrangement to many present day laptop computers where a battery-pack can be plugged in by insertion into a compartment that is accessible through a door or hatch in the bottom wall of the PC case. The hydrogen container 27 is a rechargeable item and is used whenever the user is not in a location where an electrical power source is available, for example on an airline or in some remote location. Similar to carrying a spare battery, a user simply carries a spare container that can be inserted after removal of the container that has become temporarily depleted of hydrogen. The details of the hydride container 27 and alternative versions thereof are discussed in detail hereinafter.

Figure 4:
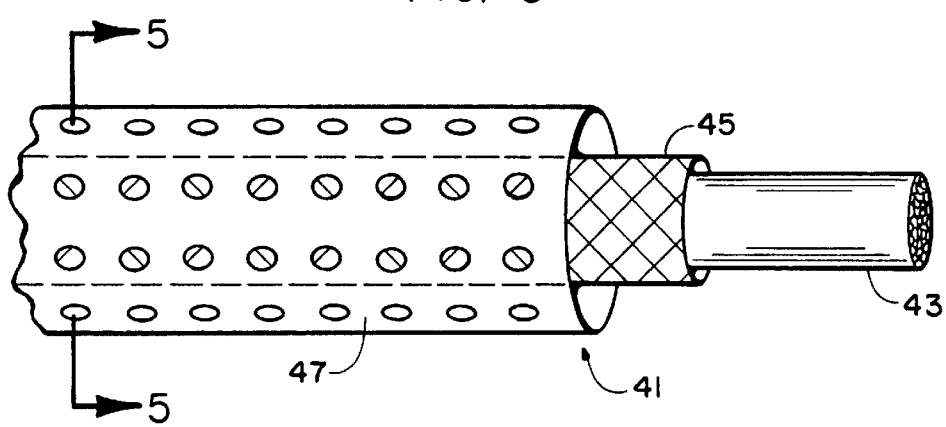
FIG. 4 is a schematic side view of a portion of the operating system for removing product water from the PEM fuel cells.
Figure 5:
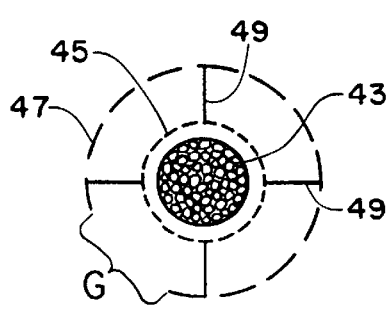
FIG. 5 is a cross-sectional view taken generally along line 5—5 of FIG. 4.

One feature of the invention employs a unique system 41 for effectively removing the by-product water from the fuel cell unit 33; this system employs a wick arrangement as the key feature and is schematically depicted in FIGS. 4 and 5. A wick 43, i.e. a hydrophilic water transporter, in its preferred form is a braided or otherwise accumulated group of strands of polypropylene fiber or some other polymeric fiber that is either inherently hydrophilic or treated so as to have hydrophilic surface characteristics. The wick 43 is located adjacent the air outlet passages from the fuel cell unit(s) 33. As mentioned above, the fuel cells are preferably located in the lid compartment and will normally be vertically aligned, or nearly vertical, when the PC is in use. The MEAs will be oriented so that the $O_2$ and $H_2$ flow channels are horizontal, and preferably at least the major portion of the wick 43 is located along a perimeter boundary of that section of the PC case containing the fuel cell unit 33, here the lid section 15, e.g. along one or both side edges of the lid.

In order to provide access to the air environment, the wick 43, which has a generally cylindrical shape, is disposed in a porous tube 45 that is positioned inside a generally coaxial porous outer tubular holder 47. This is shown schematically in FIGS. 4 and 5 wherein the wick is disposed in a central tube 45 of screen-like material and cylindrical shape. The wick 43 is preferably slightly smaller in diameter, in its dry condition, than the interior diameter of the screen-like tube 45; however, once wet, it may swell to approximately fill the cylindrical cavity thereof. Because of the high porosity of the tube 45, i.e. preferably greater than 80% and more preferably greater than 90%, the surface of the wick 43 is always exposed to the ambient environment, thus promoting evaporation at its surface. The outer coaxial holder 47 is depicted as having a large number of circular holes so that it too would be highly porous. Although the depiction is only diagrammatic, the porosity of the wall of the holder is preferably at least about 60% and more preferably at least about 80% and may be a lattice.

In order to uniformly space the wick 43 within the outer tubular holder 47, a plurality of radial arms or standoffs 49 are provided at regular intervals along the length of the coaxial tubes. These radial arms 49 can be fixed to either the exterior surface of the interior tube 45 or the interior surface of the outer perforated holder 47; they maintain the inner tube 45 (and thus the cylindrical wick itself) in substantially coaxial orientation within the outer holder. Generally, the air exiting from the $O_2$ flow channels will be at a slightly elevated temperature, for example between about 25° and about 35° C., and it will contain water vapor and some entrained water. These streams exiting from the horizontal channels in the fuel cell unit 33 will be flowing in a direction transverse, i.e. perpendicular, to the wick arrangement 41 which, as previously indicated, is preferably located in flanking arrangement along both edges of the lid. Assuming the case is made of molded polymeric material, the tubular holders 47 are preferably molded as integral edge portions of the lid 15. The exit air streams are directed radially into the annular passageway between the tube 45 and the holder 47, and the design may be such to omit a longitudinal section of the holder 47 to provide a gap (see G in FIG. 5) that would be aligned with the edge of the fuel cell unit through which the incoming air would pass. Because the air temperature will drop toward ambient, water vapor that is released from the air will condense upon the tube 45 and the wick 43 where it will be transported along the entire length of the hydrophilic wick, as a result of which there will be no dripping and no condensation on the extension surface of the case. The moisture will be always available to evaporate into the air flowing outward, which will carry the water, as humidity, exterior of the lid compartment through exit openings in the sidewall edge which partially form the holder 47. Efficiency of removal results from there being some interchange of ambient air through the openings in the outer wall of the holder 47 and exposure of the entire length of the wick to the moving air stream. As described hereinafter, the wick 43 may optionally have individual strands 43a that are disposed in the air passageways in the cathode supply plate.

The movement of air into the fuel cell unit(s) 33 is preferably provided by the blower 23 in the base compartment which takes its suction from an adjacent entrance opening in one vertical sidewall of the base compartment and directs the air past the CPU 21 to cool it and maintain it at an optimum operating temperature. The blower 23 is preferably connected by a conduit to the sidewall entrance opening and thus creates an overpressure throughout the base compartment. Air leaves the base compartment through an interconnecting passageway system provided in the hinge 17b. While the blower is running, it causes a continuous stream of air to leave the base compartment and flow through the hinge passageway system where it enters a conduit arrangement 51 (FIG. 3) that directs the air to the feed side of the fuel cell unit 33 (to the feed sides of each of a plurality of fuel cell subunits when more than one stack of fuel cells is employed). At each fuel cell unit or subunit, the stream of air is directed to a manifold 53b as generally depicted in the '118 patent, from which it then flows through flow passageways or channels 54b provided adjacent the cathode surface of each MEA, with similar dead end channels 54a being provided adjacent the anode surface thereof. If desired for design purposes, a separate blower might be used solely for $O_2$ supply purposes which could also be located in the base compartment but might alternatively be located in the lid compartment if a flat profile blower were used.

During its travel through the fuel cell unit 33, the air flowing in these parallel channels 54b is slightly depleted in oxygen and picks up water vapor being created at the cathode and perhaps even some entrained microdroplets of water. According to the preferred embodiment, a single blower 23 in the base compartment, through this novel arrangement, supplies not only the cooling for the CPU 21 in the base compartment but the oxygen for reaction at the fuel cells in the lid compartment while also carrying away heat from the fuel cells so that they are maintained within a desired operating temperature range, e.g. of about 50° to about 80° C.

Figure 8:
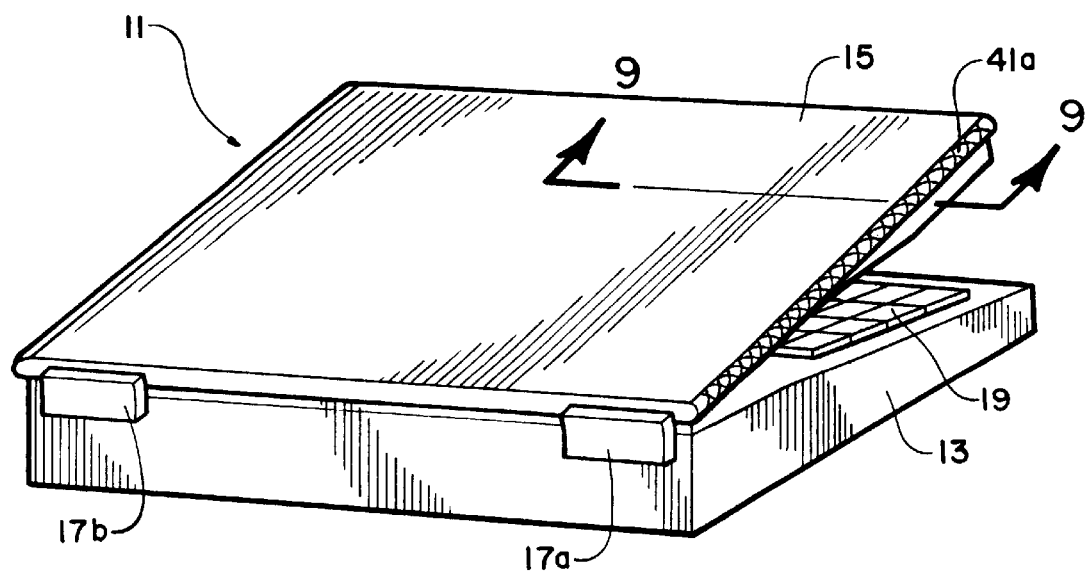
FIG. 8 is a perspective rear view of a PC schematically showing a water transportation system located along two side edges of the lid section.
Figure 9:
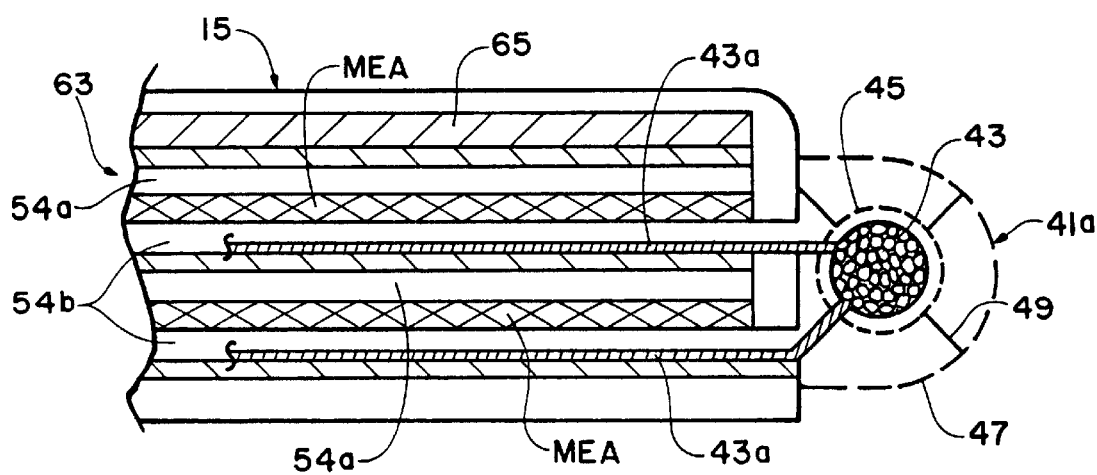
FIG. 9 is an enlarged fragmentary diagrammatic view taken generally along the line 9—9 showing a side edge portion of the lid which illustrates the location of the wick system.

In the preferred example, the wick arrangement 41 including the coaxial perforated tube and holder will extend along both side edges of the lid compartment 15 of the PC as depicted in FIG. 8. Two wick sections 41a are located, in parallel orientation, along each of the two side edges of the lid compartment, where they would in fact flank the display screen 31 as seen in FIGS. 8 and 9. In this embodiment, two side-by-side fuel cell units 33a are used with the air being supplied centrally therebetween. Thus, two streams of air would be traveling in opposite directions toward the side edges. In this orientation, the streams of air deliver the moisture generally along the length of each wick allowing any moisture to condense thereupon throughout the hydrophilic material, slowly evaporating thereafter into the air streams as humidity conditions permit and traveling out through the openings in the sidewalls of the lid compartment.

From the standpoint of the wick arrangement, FIG. 9 shows an alternative embodiment that might be employed to that previously described which simply relied upon the moving streams of air to carry moisture to the hydrophilic wick material 43. In the FIG. 9 embodiment, the individual strands 43a of the stranded wick material 43 are branched from the main cylindrical body of the wick and located near the bottoms of the flow passageways 54b that carry the air past the cathode surface of the MEA. It is possible that small water droplets could condense in the small parallel channels 54b that carry the flow of air, and such a water droplet could create a blockage that would then prevent air (oxygen) from reaching the open exit end of the passageway, thus potentially starving a small portion of the MEA downstream of such blockage of its oxygen fuel and slightly reducing power production in that fuel cell. However, by disposing a small strand 43a of hydrophilic fibers at the bottom of the air flow passageways 54b, if a droplet were to form and, through surface tension, have such a potentially undesirable blocking effect, the water would be quickly absorbed onto the hydrophilic material which, as shown in FIG. 9, would simply convey it downstream through the passageway to the main body 43 of the wick itself. Accordingly, this alternative embodiment, wherein small branches 43a of the wick material 43 extend into the air channels, very effectively removes any water droplets that might otherwise potentially block air flow in one or more of the parallel passageways.

As earlier mentioned, the fuel for the anode, hydrogen gas, is supplied by a supply conduit arrangement 29 from a rechargeable hydrogen container 27 connected thereto which leads to the passageway in the hinge 17b and then to a tubing arrangement 61 in the lid 15 which delivers $H_2$ to a similar manifold 53a that feeds the $H_2$ flow channels 54a located along the anode surface of each MEA. Hydrogen is stored in hydride form using an alloy material that will chemically absorb the hydrogen in the form of a hydride, which materials are sometimes referred to as hydrogen occlusion alloys. There are a number of these alloys being marketed commercially, one of which is sold by Ergenics under the trademark Hy-Stor™. Some of them include iron-titanium-magnesium alloys, e.g. about 44 weight % iron, 55 weight % titanium and 5 weight % maganese, and Mischmetal-nickel-aluminum hydrides. The preferred metal hydride that employed is one which has a composition of about 45–50% Mn, 20–25% Ti, 10–15% Zr, 10–15% V, 2–5% Fe and 1–2.5% Ni or an equivalent that readily releases hydrogen at room temperature; preferably, the alloy will inherently provide between about 1 and about 3 atmospheres of hydrogen at ambient temperature, i.e. about 25° C., and preferably between about 1.3 and about 1.7 atm.

Figure 14:
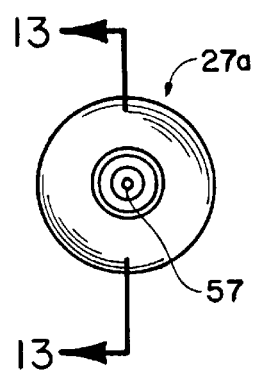
FIGS. 13 and 14 are a cross-sectional view and an end view of an alternative form of a hydride container.
Figure 13:
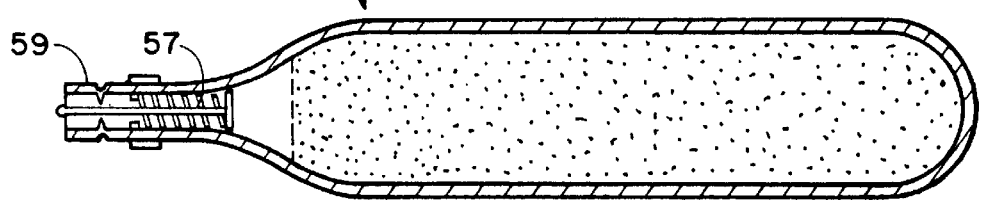

The metal alloy material will be in particulate form so as to have a relatively large surface area per unit of mass to promote the chemical absorption and desorption of hydrogen from the alloy in order to maintain a relatively uniform vapor pressure of hydrogen within the sealed container. One type of traditional hydrogen container 27a is illustrated in FIGS. 13 and 14 and includes a generally cylindrical sealed body 55 having a valve 57 and quick-disconnect connector 59 at one end. Containers of this type are well known in the art and are disclosed for example in U.S. Pat. No. 5,932,365 (Aug. 3, 1999). The container 27 will have a spring-loaded valve member 57 that is biased to the closed position and has an elongated valve stem that will be moved inwardly against the force of a spring when connection is made with the conduit network 29 that is used to deliver the hydrogen to the fuel cell unit. The specifics of the quick-disconnect connector form no part of the invention; it simply allows the container 27 to be easily replaced by disengagement of the connector 59 of a container whose hydrogen supply has been exhausted and substitution of a fresh recharged container.

As indicated above, the alloy may be selected so that, at about room temperature, a pressure of preferably about 1.3 to 1.7 atmospheres, will preferably be maintained throughout the conduit system 29 that includes the conduit network in the base compartment leading to a second gas passageway system in the hinge 17b that interconnects with a hydrogen conduit system in the lid compartment leading to the fuel cell unit 33. The arrangement is such that the parallel flow field channels on the anode side of each MEA, which channels dead end, will be filled with hydrogen at about this pressure, causing the hydrogen to permeate into the MEA where it comes in contact with the particulate platinum and is converted to hydrogen ion. There is no gas outlet on the anode side other than permeation into the electrolyte.

As previously indicated, a relatively low overpressure of hydrogen is preferred so that the gas pressure on the anode side will be approximately balanced by the relatively low pressure on the cathode side that results from maintaining the flow of air through the flow feed channels. Preferably, a pressure of about 1.3 or 1.4 atmospheres of hydrogen is preferred which is approximately balanced by the air pressure on the cathode side; thus, no specific particular reinforcement is required.

The fuel cell unit 33 preferably includes a plurality of subunits 63 arranged in a generally planar array inside the cover of the lid section 15. Each individual cell should generate about 0.7 V, i.e., between about 0.5 and 0.8 V, and by linking four or six cells together in series electrical connection in a stack 63, a composite voltage of about 2 to about 4.8 V is obtained. Accordingly, one subunit of 2 MEAs side-by-side (see FIG. 3) might be stacked atop another unit of 2 MEAs, with the 4 cells being electrically connected in series. FIG. 3 is diagrammatic and shows $H_2$ manifold 53a and flow channels 54a for the anode of the left-hand cell and the air manifold 53b and the flow channels 54b for the cathode of the right hand cell. Dimensions of each MEA might be about 10 cm by 10 cm, and such a cell of 100 cm² may generate over 50 amperes. Located as a generally planar array adjacent the cover of the lid there might be two or three such subunits in a stack. The four or six individual cells would be connected together in series electrical connection. A single electrical connector would lead, in this instance, through the sliding connection in the hinge 17a to the DC/DC converter 37 which would boost the voltage to between about 12 and 15 V, which is adequate to run the CPU and the motor for the blower motor 23.

The orientation of the cells in the stack is such that an anode is located facing the rear or cover wall of the lid while the cathode side of each cell faces the display screen rear surface. Preferably, there is juxtaposed with the anode side of the fuel cell subunit 63 a heat transfer plate 65 having a thermal conductivity at least about 50 watts/meter-Kelvin. Preferably, an aluminum or copper metal plate or a plate made of a composite material having a high thermal conductivity (e.g. containing carbon whiskers or metal shavings) is used that will pick up heat by radiation and convection from the fuel cell unit and transfer it to the abutting lid surface of the laptop PC, whence it is transferred to the atmosphere through radiation and convection. Accordingly, this arrangement further assists in lowering the temperature within the lid compartment by collecting heat from the fuel cell subunits 63 and transferring it exterior of the PC case.

Figure 12:
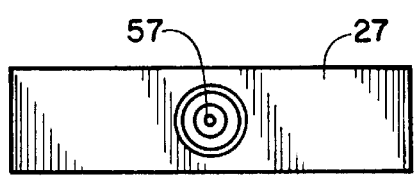
FIGS. 10, 11 and 12 are, respectively, top, cross-sectional and front views of a hydride container that might be employed in the computer of FIG. 1.
Figure 11:
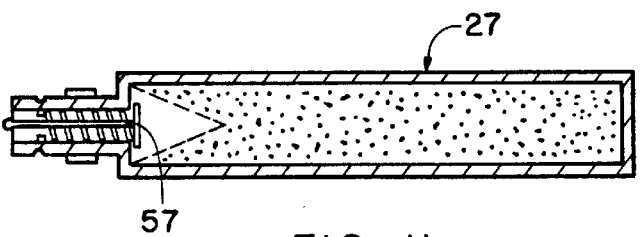
Figure 10:
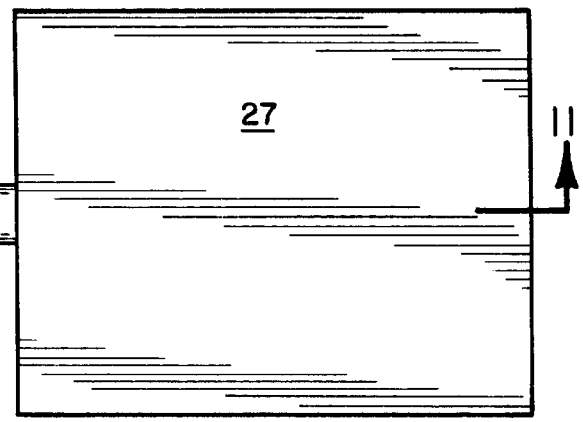
Figure 15:
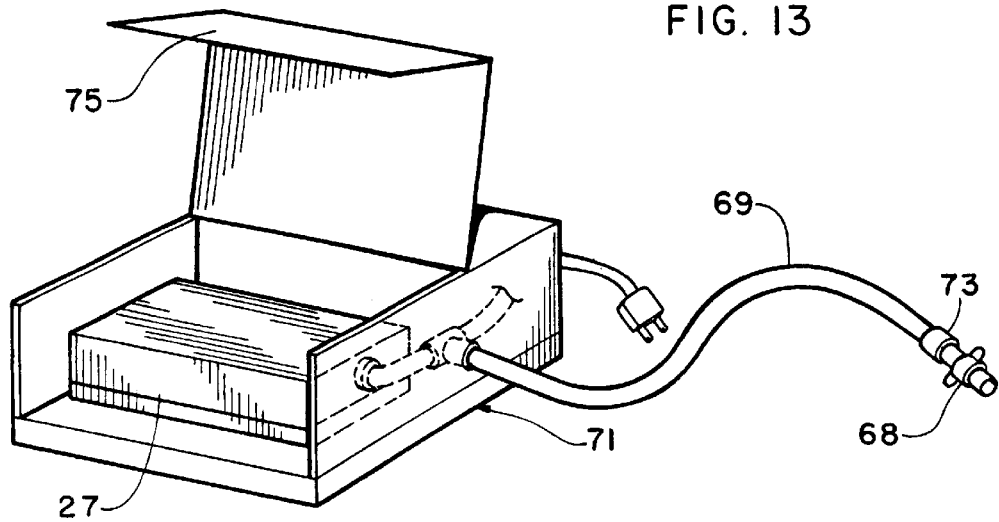
FIG. 15 is a perspective view of the electrolyzer of FIG. 1 opened to show a hydride container in recharge position.

FIGS. 10, 11 and 12 show one embodiment of a large hydrogen container 27 in the form of a fairly flat rectangular parallelepiped which is received in the complementary compartment 29 provided in the base compartment 13 of the PC. It has a quick-disconnect connector 59 and valve 57, similar to those described above, in order to likewise connect to an inlet fitting on the hydrogen conduit system 29 in the base compartment. This $H_2$ conduit system leads to the interconnection in the hinge 17b, as previously described; it also contains a second inlet 67 in the base compartment sidewall for recharging purposes which similarly includes a connector containing a normally closed valve. It is designed to mate with a connector 68, preferably a quick-disconnect connector, at the end of a flexible tube 69, as depicted in FIG. 15, leading from an electrolyzer unit 71 that will provide a stream of hydrogen gas. The connector at the end of the flexible tube 69 that similarly has a normally closed valve so that the electrolyzer unit 71 can be operated, if desired with the flexible conduit 69 unattached to a PC, so as to only recharge a separate hydrogen container 27 installed therein. It also contains a standard check valve 73 to permit only outflow through the flexible line.

It has long been known that water can be separated electrolytically into oxygen ($O_2$) and hydrogen ($H_2$). The two gases are generated as separate streams, and there have long been commercial units available for this purpose. The electrolyzer 71 used to recharge the $H_2$ containers 27 for use in the PC 11 is preferably one that employs a separation technology wherein an ion exchange membrane is employed. The electrolyzer 71 has a tank that is filled with alkaline or acidic electrolyte and will be replenished with distilled or demineralized water, and water from the tank is supplied through a check valve to a cell assembly containing an ion exchange membrane. The water flows back to the storage tank, taking with it the oxygen that is created which is subsequently vented to the atmosphere through a vent provided at another location in the electrolyzer. The hydrogen, which is primarily destined for delivery to recharge a container 27, is dried to remove water using a peltier junction and/or chemical desiccant or the like.

The electrolyzer 71 includes a pressure regulator which is used to set the desired maximum pressure of the $H_2$ gas being delivered, e.g. about 1.5 atmosphere. This $H_2$ pressure, when the flexible tubing 69 is connected, supplies $H_2$ directly to the PC conduit system 29. However, the electrolyzer, as best seen in FIG. 15, also contains a door or hatch cover 75 through which a hydrogen container 27 can be installed using a similar quick-disconnect fitting as described hereinbefore. Thus, when the electrolyzer 71 is operating, it will supply $H_2$ both through the flexible conduit 69 and to the fitting to which the $H_2$ container 27 is internally connected to as to recharge the container that has been installed in the electrolyzer while charging and/or operating the PC. It can be seen that, using the illustrated arrangement, $H_2$ gas will be supplied at a pressure of about 1.5 atmospheres to a container installed in the electrolyzer itself and through the flexible conduit 69 to the $H_2$ conduit system 29 in the base compartment 13 of the PC. Thus, the $H_2$ gas being generated will simultaneously provide hydrogen to operate the PC and will supply hydrogen gas to the hydrogen container 27 that is installed in the PC itself, thus recharging the PC container. The electrolyzer includes a pressure gauge which halts electrolysis when the target pressure is slightly exceeded, thus halting operation until the pressure drops just below the desired target pressure which will occur either as a result of slow absorption onto the particulate alloy material in a hydrogen container or operation of the fuel cell unit 33 for the PC. This arrangement provides a safety feature to avoid excess hydrogen generation, and the electrolyzer 71 automatically begins electrolysis operation once the pressure drops a few percent below the desired level. It has been found that, by designing a system wherein operation can be effectively carried on at a hydrogen pressure of between about 1 and 3 atmospheres, and preferably between about 1.3 and 1.7 atmospheres, a particularly efficient arrangement is possible wherein the PC can continue to be operated while two hydrogen containers are being simultaneously recharged.

Figure 6:
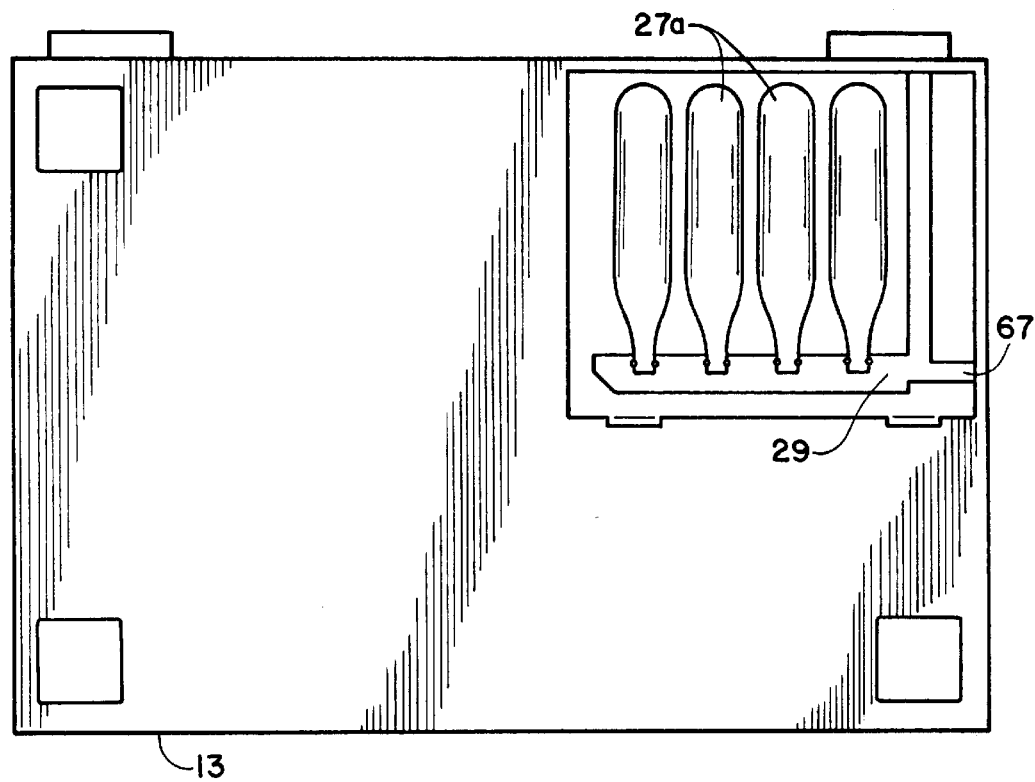
FIG. 6 is a schematic view showing an alternative embodiment wherein multiple hydride containers are located in the base section of the laptop computer, shown with the compartment cover removed.

While the invention has been disclosed with regard to certain preferred embodiments which constitute the best mode presently known to the inventors, it should be understood that various modifications and changes as would be obvious to one having the ordinary skill in this art may be made without departing from the scope of the invention, which is set forth in the claims appended hereto. Although the preferred arrangement is that shown wherein the fuel cells are located in the lid compartment behind the official display screen, if the fuel cells were made in the form of plates of less area, these plates might be stacked one atop another in a thick array or brick form that could be accommodated in the base compartment generally similar to the present-day battery pack that is used to commonly drive a laptop PC. In such an arrangement or in the present arrangement for that matter, instead of locating the hydride fuel container in the base compartment itself, an elongated hollowed-out hinge could be provided that would accommodate one or two cylindrical fuel containers of the general type depicted in FIGS. 13 and 14. Such a container could be inserted from either or both ends of the PC hinge while the central portion of the hinge is reserved for the electrical connections between the lid and the base compartment and the gas passageways for one or more of the reactants for the PEM cell. In addition, instead of powering the PC from a single large hydride containing container, a plurality of smaller cylindrical containers of the type depicted in FIGS. 13 and 14 might be employed, as illustrated in FIG. 6, which shows an alternative arrangement where a hydrogen conduit system 29a is depicted which would have the usual charging opening at a sidewall of the base compartment but would have an extended manifold leg that would contain four quick-disconnect connectors to which four separate smaller hydride containers could be attached. The disclosures of all U.S. patents mentioned are incorporated herein by reference.

Particular features of the invention are emphasized in the claims that follow.

What is claimed is:

1. A portable electronic device which is powered by a proton exchange membrane (PEM) fuel cell that produces water as a by-product of electricity generation, which device comprises a two-piece case, a CPU in a first piece of said case, a display screen in a second piece of said case, a fuel cell for providing electric power which creates water as a by-product in one of said pieces of said case, which piece also contains an exit opening to the exterior, and a hydrophilic water transporter for transferring said by-product water away from said fuel cell, which water transporter is located along a perimeter boundary of said piece of said case that contains said fuel cell, said water transporter including a perforated outer generally tubular holder which is associated with said exit opening and a generally coaxial perforated inner tube of lesser diameter with elongated hydrophilic wick material disposed within said inner tube, whereby said water transporter adsorbs water in the vicinity of said fuel cell and said adsorbed water is distributed along and throughout said hydrophilic wick, aiding its evaporation into air in the annular region between said perforated inner and outer tubes, and subsequently exits from said case as water vapor via said exit opening.

2. The device according to claim 1 wherein said inner tube and said outer tubular holder include generally radially extending stand-offs which maintain said generally coaxial spaced apart relationship.

3. The device according to claim 1 wherein said elongated wick material is generally circular in cross-section and has a diameter so as to fit closely within said inner perforated tube.

4. The device according to claim 1 wherein said porous outer holder is formed as an integral part of said piece of said case.

5. The device according to claim 4 wherein said fuel cell is located in said second piece of said case and said water transporter is formed as two separate units with one unit being located along each one of two parallel side edges of said piece of said case in which said display screen is located, which case is generally rectangular in shape.

6. The device according to claim 5 wherein said case includes blower means and conduit means arranged so that said conduit means supplies a stream of air pressurized by said blower means centrally between two side-by-side fuel cells so that air flows through parallel channels past the cathodes and then transversely through said coaxial tube arrangement and out said exit opening.

7. The device according to claim 6 wherein a single blower means supplies air to cool said CPU and then through said conduit means to a cathode side of said fuel cell and thereafter through said coaxial conduit arrangement.

8. The device according to claim 6 wherein said elongated wick material comprises an elongated body that includes a bundle of strands of hydrophilic fibrous material.

9. The device according to claim 8 wherein individual strands from said bundle branch from said elongated body and individually extend into said parallel air flow channels so as to guard against potential water droplet blockage of an individual air flow channel.

10. A portable electronic device which is powered by a proton exchange membrane (PEM) fuel cell in combination with an electrolyzer unit for recharging a hydrogen reservoir, which combination comprises (a) an electronic device disposed within a carrying case along with a fuel cell, a first hydrogen reservoir and a conduit arrangement interconnecting said hydrogen reservoir and said fuel cell,
said conduit arrangement includes a line leading to a recharging connector which transverses a wall of said case,
said hydrogen reservoir being detachably connected to said conduit arrangement to permit its optional removal and replacement, and (b) an electrolyzer unit including means for generating hydrogen gas and supplying said generated gas (i) to a second hydrogen reservoir detachably connected to said electrolyzer unit and (ii) to flexible tubing for connection to said conduit arrangement and therethrough to both said fuel cell and to said first hydrogen reservoir, whereby said electrolyzer can supply hydrogen gas to power said device while simultaneously recharging said first and second reservoirs.

11. The combination according to claim 10 wherein said first and second hydrogen reservoirs contain a mass of powder having a high surface area which powder is an alloy including manganese, titanium, vanadium and zirconium, said alloy having the ability to chemically absorb hydrogen in hydride form.

12. The combination according to claim 11 wherein said alloy can be reversibly converted to a hydride by recharging with a supply of hydrogen gas at an absolute pressure of about 1.5 atmospheres at ambient temperature.

13. The combination according to claim 12 wherein said device is a PC having a two-piece hinged case and said conduit arrangement contains a passageway through a hinge of said case to said fuel cell which is in the other piece thereof from that piece containing said first container.

14. The combination according to claim 10 wherein said line leading to said recharging connector has a check valve that allows hydrogen flow in only one direction.

15. The combination according to claim 14 wherein said electrolyzer includes a check valve which allows flow only in one direction out through said flexible conduit.

16. A portable personal computer (PC) which is powered by a proton exchange membrane (PEM) fuel cell that produces water as a by-product of electricity generation, which device comprises a two-piece case, a CPU in a first piece of said case, a display screen in a second piece of said case, hinge means interconnecting said two case pieces, blower means residing in said first piece of said case for circulating cooling air past said CPU, fuel cell means for providing electric power which creates water as a by-product in said second piece of said case, said fuel cell means being electrically connected to said CPU through said hinge means, said first case piece being formed with air entrance means through which said blower means takes suction, and said second case piece being formed with air exit means, and passageway means extending through said hinge means and interconnecting the interiors of said two case pieces, so that air blown past said CPU flows through said passageway means and then through said PEM fuel cell means, providing oxygen thereto, taking up by-product water as vapor, and carrying said water vapor exterior of said second case piece through said air exit means.

17. The portable PC according to claim 16 wherein said fuel cell means includes at least two thin flat fuel cells in a side-by-side array located behind said display screen and interconnected to one another in series electrical connection with the cathode surface of each facing the rear of said display screen and with air being supplied to parallel flow channels extending across said cathodes from a manifold located centrally between said two fuel cells.

18. The portable PC according to claim 17 wherein at least four fuel cells are provided in two stacks in a generally planar array and electrically connected in series.

19. The portable PC according to claim 18 wherein said case second piece includes flat plate means having good thermal conductivity in a wall section of said case adjacent to the anode sides of said fuel cells in said plurality of stacks which plate collects heat therefrom and radiates such heat exterior of said case.

20. The portable PC according to claim 18 wherein said first case piece is a base section, said second case piece is a lid section and contains a conduit arrangement constructed so that air flowing into said lid section of said case through said passageway means flows into central manifold means located between said two stacks whence it is distributed across said cathode surfaces in parallel flow channels.

* * * * *